R. J. WELLES.
Wrench.

No. 167,717. Patented Sept. 14, 1875.

UNITED STATES PATENT OFFICE.

RICHARD J. WELLES, OF ST. JOSEPH, MISSOURI.

IMPROVEMENT IN WRENCHES.

Specification forming part of Letters Patent No. 167,717, dated September 14, 1875; application filed May 28, 1875.

*To all whom it may concern:*

Be it known that I, RICHARD J. WELLES, of St. Joseph, Buchanan county, Missouri, have invented a new and useful Improvement in Monkey-Wrenches, of which the following is a specification:

The invention will first be described in connection with drawing, and then pointed out in the claim.

Figure 1 is a sectional side view of the wrench, the section being taken on the line $x\,x$ of Fig. 2, looking toward the handle; and Fig. 2 is a cross-section of Fig. 1, taken on the line $y\,y$.

Similar letters of reference indicate corresponding parts.

A is the bar of the wrench. B is the stationary jaw. C is the movable jaw, which is connected with the slide D by the brace-bar E. F is a nut, with which the slide D is connected by means of the semicircular collar G and a groove in the nut F. This arrangement allows the nut to turn to adjust the sliding jaw. A screw-thread is cut in the bar A, as seen in the drawing. H represents the handle of the wrench, through which a thread is cut, so that the handle screws on and serves as a "jam-nut" for the nut F, and effectually resists the strain upon that nut. I is the end of the wrench-bar, which is tapered down to serve as a screw-driver.

The handle may be made all metal, or with a metallic core, with the outside of wood, as may be preferred.

The valuable feature of all monkey-wrenches is the power to resist strain. With this construction the wrench possesses this feature in an eminent degree. No part is likely to fail or get out of order.

Having thus described my invention, I claim as new and desire to secure by Letters Patent—

The handle H, threaded and movable on screw-shank, to form an adjustable jam-nut to the revolving nut F', as shown and described.

RICHARD J. WELLES.

Witnesses:
 JOHN SEVERANCE,
 ANDREW L. KERR.